US008170747B2

(12) United States Patent
Chen et al.

(10) Patent No.: US 8,170,747 B2
(45) Date of Patent: May 1, 2012

(54) FLEET MAINTENANCE METHOD AND IN-VEHICLE COMMUNICATION SYSTEM

(75) Inventors: Chien Chen, Hsinchu County (TW); Ho-Wei Tsai, Taipei County (TW); Je-Wei Chang, Taipei (TW); Rong-Hong Jan, Hsinchu (TW); Hsia-Hsin Li, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 456 days.

(21) Appl. No.: 12/538,165

(22) Filed: Aug. 10, 2009

(65) Prior Publication Data

US 2010/0268445 A1 Oct. 21, 2010

(30) Foreign Application Priority Data

Apr. 15, 2009 (TW) ............................... 98112537 A

(51) Int. Cl.
*G06F 7/00* (2006.01)

(52) U.S. Cl. ........... 701/36; 701/34.4; 701/79; 701/119; 340/435

(58) Field of Classification Search ................. 701/34.4, 701/34.2, 36, 79, 93, 119, 469; 340/438, 340/435, 436, 988
See application file for complete search history.

(56) References Cited

U.S. PATENT DOCUMENTS 6,434,512 B1 * 8/2002 Discenzo ...................... 702/184
6,954,689 B2 * 10/2005 Hanson et al. ............... 701/32.4

OTHER PUBLICATIONS

N. Wisitpongphan, F. Bai, P. Mudalige, and O. K. Tonguz, "On the Routing Problem in Disconnected Vehicular Ad Hoc Networks," Proc. IEEE INFOCOM 2007, pp. 2291-2295.
Craig W. Reynolds "Flocks, Herds, and Schools: A Distributed Behavioral Model," Proceedings of 1987 SIGGRAPH Conference.
Hai-Tao-Zhang et al., "Predictive protocol of flocks with small-world connection pattern," PhysCon, Germany ,2008.
R. Saber and R. Murray, "Flocking with Obstacle Avoidance: Cooperation with Limited Communication in Mobile Networks," Proceedings of the 42nd IEEE Conference on Decision and Control, Hawaii, USA, Dec. 2003, pp. 2022-2028.
D. Rosen "Cooperation and coordination in decentralized communication networks," Proceedings of the 41st Hawaii International Conference on System Sciences, 2008, pp. 1-10.
W.Chen,J. Chennikara-Varghese, and J. Lee "Dynamic Local Peer Group Organizations for Vehicle Communications," V2VCOM 2006 Workshop co-located with ACM MobiQuitous, Jul. 2006.
P. Fan, "Cluster-Based Framework in Vehicular Ad Hoc Networks," University of Illinois at Chicago, AI Lab.

(Continued)

*Primary Examiner* — Gertrude Arthur Jeanglaude
(74) *Attorney, Agent, or Firm* — Jianq Chyun IP Office

(57) ABSTRACT

A fleet maintenance method for generating a suggested speed for each vehicle in a fleet to maintain the vehicle in the fleet is provided. In the fleet maintenance method, vehicles are clustered into a plurality of sub-fleets, and in each sub-fleet, one vehicle is selected as a leader vehicle and the other vehicles are considered as member vehicles. Besides, a position coordinate and a speed of each vehicle in each sub-fleet are obtained, and the position coordinate is converted into a corresponding linear coordinate. In addition, a sub-fleet gravity center of each sub-fleet and a fleet gravity center of the entire fleet are calculated according to the linear coordinates. Moreover, a suggested speed of each leader vehicle is generated according to a gravity center distance of the leader vehicle, and a suggested speed of each member vehicle is generated.

17 Claims, 8 Drawing Sheets

OTHER PUBLICATIONS

Bo Liu, Tianguang Chu, and Long Wang, "Flocking of Multi-Vehicle Systems With a Leader," Proceedings of the 2006 IEEE/RSJ International Conference on Intelligent Robots and Systems, Oct. 9-15, 2006, Beijing, China, pp. 5948-5953.

Nawaporn Wisitpongphan, Fan Bai, Priyantha Mudalige, Varsha Sadekar, and Ozan Tonguz,"Routing in Sparse Vehicular Ad Hoc Wireless Networks," IEEE Journal on Selected Areas in Communications, vol. 25, No. 8, Oct. 2007, pp. 1538-1556.

H. G. Tanner, A. Jadbabaie and G. J. Pappas, "Flocking in teams of nonholonomic agents," pp. 1-11.

A. Ephremides, J. E. Wieselthier, and D. J. Baker, "A design concept for reliable mobile radio networks with frequency hopping signaling," Proc. of the IEEE, vol. 75, No. 1, Jan. 1987, pp. 56-73.

Xi Zhang, Hang Su, and Hsiao-Hwa Chen, "Cluster-based Multi-channel Communications Protocols in Vehicle Ad Hoc Networks," IEEE Wireless Communications, Oct. 2006, pp. 44-51.

Peng Fan, James Haran, John Dillenburg, and Peter Nelson, "Traffic Model for Clustering Algorithms in Vehicular Ad-Hoc Networks," IEEE CCNC 2006 proceedings, pp. 168-172.

M. Gerla et al., "Multicluster, mobile, multimedia radio network," Baltzer Journals, Jul. 12, 1995, pp. 1-26.

* cited by examiner

FLEET MAINTENANCE METHOD AND IN-VEHICLE COMMUNICATION SYSTEM

CROSS-REFERENCE TO RELATED APPLICATION

This application claims the priority benefit of Taiwan application serial no. 98112537, filed on Apr. 15, 2009. The entirety of the above-mentioned patent application is hereby incorporated by reference herein and made a part of specification.

BACKGROUND

1. Technology Field

The present disclosure relates to a fleet maintenance method and an in-vehicle communication system.

2. Description of Related Art

Along with the development of technologies and vehicles, people travel around more often than before, and accordingly, an information system that can provide destination guidance or map navigation is deeply desired. Thanks to the widespread of personal mobile devices and the commercialization of the Global Position System (GPS), GPS navigation devices have been brought into the market.

An existing portable electronic device can be integrated with GPS techniques and used for navigation and positioning, especially for the navigation and positioning of various vehicles, ships, and airplanes. The portable electronic device may be a portable electronic device with a built-in or add-on GPS antenna module, such as a mobile phone, a personal digital assistant (PDA), or a navigator. Nowadays, people like to bring electronic devices with GPS function when they travel around. Navigation software and other map data of different zones are usually stored in such an electronic device so that a user can drive his vehicle in an unacquainted zone according to the electronic map of the zone displayed in the screen of a navigator.

However, the aforementioned GPS navigation device can only provide the position of the vehicle but not allow the vehicle to communicate with a current fleet. In order to allow vehicles to communicate with each other, the Federal Communications Commission (FCC) provides a bandwidth of 5.85-5.925 GHz for the communication between vehicles and between vehicle and roadside units (RSUs). To be specific, each vehicle is equipped with some storage devices and transceiver units so that the vehicle can be considered a mobile router that can store or transmit messages. This technique is especially applied to telematic entertainment services and traffic safety.

A vehicle ad-hoc network (VANET) formed between communication devices in different vehicles is considered a special application of the mobile ad-hoc network (MANET). In a VANET, vehicles are considered mobile nodes distributed on the roads, and these vehicles move around in a special way to form a network topology and network features different from those of a general MANET. For example, when a fleet including a plurality of vehicles goes on the road, the network of the fleet may be broken or terminated by different road conditions (for example, traffic lamps and traffic jam, etc). More importantly, the quality of services (QoS) may be reduced due to the lack of a reliable transmission medium between the vehicles.

FIG. 1 is a diagram of a travelling fleet. Referring to FIG. 1, the fleet includes vehicles 102, 104, 106, 108, 110, 112, 114, and 116. When the fleet travels, the vehicles 102, 104, 106, 108, 110, 112, 114, and 116 may be scattered and accordingly cannot know the positions of each other due to some road conditions (for example, traffic lamp and traffic jam, etc).

Thereby, when people travel in a fleet, it is very important to keep every vehicle in the fleet or allow a leader of the fleet to know the current position of each vehicle in the fleet.

SUMMARY

Consistent with the invention, there is provided a fleet maintenance method for maintaining a fleet, wherein the fleet has a plurality of vehicles. The fleet maintenance method includes clustering the vehicles in the fleet into a plurality of sub-fleets and selecting one of the vehicles in each of the sub-fleets as a leader vehicle and the other vehicles as member vehicles. The fleet maintenance method also includes obtaining a position coordinate and a speed of each vehicle in each of the sub-fleets and converting the position coordinate of the vehicle into a corresponding linear coordinate. The fleet maintenance method further includes calculating a sub-fleet gravity center of each sub-fleet according to the corresponding linear coordinates of the vehicles in the sub-fleet and calculating a fleet gravity center of the entire fleet according to all the sub-fleet gravity centers of the sub-fleets. The fleet maintenance method still includes generating a suggested speed of each leader vehicle according to a gravity center distance of the leader vehicle, wherein the gravity center distance of the leader vehicle is calculated according to a distance between the leader vehicle and the fleet gravity center.

Also consistent with the invention, there is provided an in-vehicle communication system suitable for being disposed in a vehicle and maintaining the vehicle in a fleet. The in-vehicle communication system includes a microprocessor unit, a sub-fleet clustering unit, a positioning unit, a speed detection unit, a transceiver unit, a linear coordinate conversion unit, a gravity center calculation unit, and a suggested speed generation unit. The sub-fleet clustering unit is coupled to the microprocessor unit, and the sub-fleet clustering unit clusters the vehicle into a sub-fleet and determines the vehicle as a leader vehicle or a member vehicle. The positioning unit is coupled to the microprocessor unit, and the positioning unit receives a plurality of position information from a positioning system to determine a position coordinate of the vehicle. The speed detection unit is coupled to the microprocessor unit, and the speed detection unit detects a speed of the vehicle. The transceiver unit is coupled to the microprocessor unit, and the transceiver unit receives the position coordinates and speeds of a plurality of other vehicles in the sub-fleet from the other vehicles. The linear coordinate conversion unit is coupled to the microprocessor unit, and the linear coordinate conversion unit converts the position coordinate of the vehicle and the position coordinates of the other vehicles into a plurality of corresponding linear coordinates. The gravity center calculation unit is coupled to the microprocessor unit, and the gravity center calculation unit calculates a sub-fleet gravity center of the sub-fleet according to the corresponding linear coordinates, wherein the gravity center calculation unit further calculates a fleet gravity center of the fleet according to other sub-fleet gravity centers received by the transceiver unit from other leader vehicles and the sub-fleet gravity center. The suggested speed generation unit is coupled to the microprocessor unit, wherein when the sub-fleet clustering unit determines the vehicle as the leader vehicle, the suggested speed generation unit generates a suggested speed for the vehicle according to a gravity center distance between the fleet gravity center and the vehicle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

According to embodiments of the present invention, a fleet maintenance method which can effectively maintain the clustered extent of vehicles is provided.

According to embodiments of the present invention, an in-vehicle communication system which can timely provide a suggested speed for each vehicle to maintain the vehicle in a fleet is provided.

In the fleet maintenance method provided by the present exemplary embodiment, vehicles in the same fleet can exchange information (for example, the position coordinate and speed of each vehicle) with each other through stable and low-cost connections, and a suggested speed can be provided to each vehicle according to such information. Namely, by exchanging such information, the system can remind the driver of a vehicle to increase the speed of the vehicle when the vehicle falls behind the entire fleet and to reduce the speed of the vehicle when the vehicle is too much ahead of the entire fleet. Thereby, the clustered extent of the fleet can be maintained.

Figure 1:
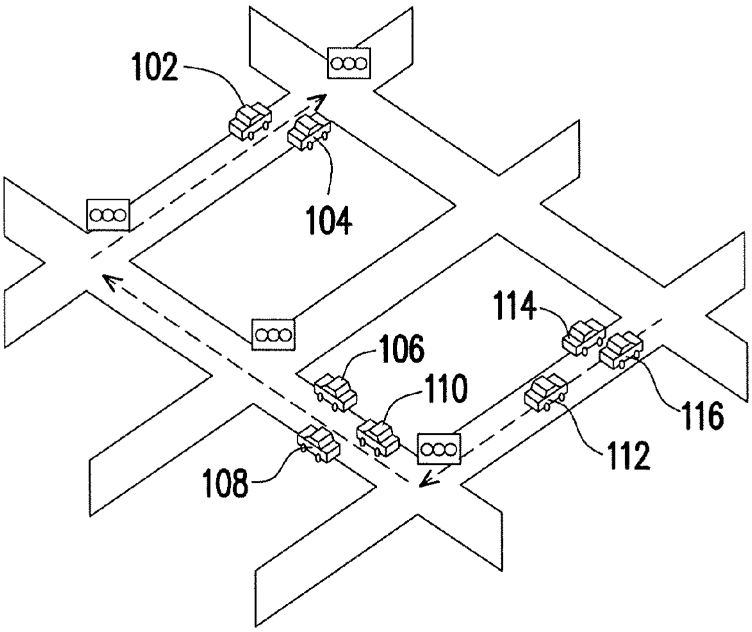
FIG. 1 (PRIOR ART)
FIG. 1 is a diagram of a travelling fleet.
Figure 2:
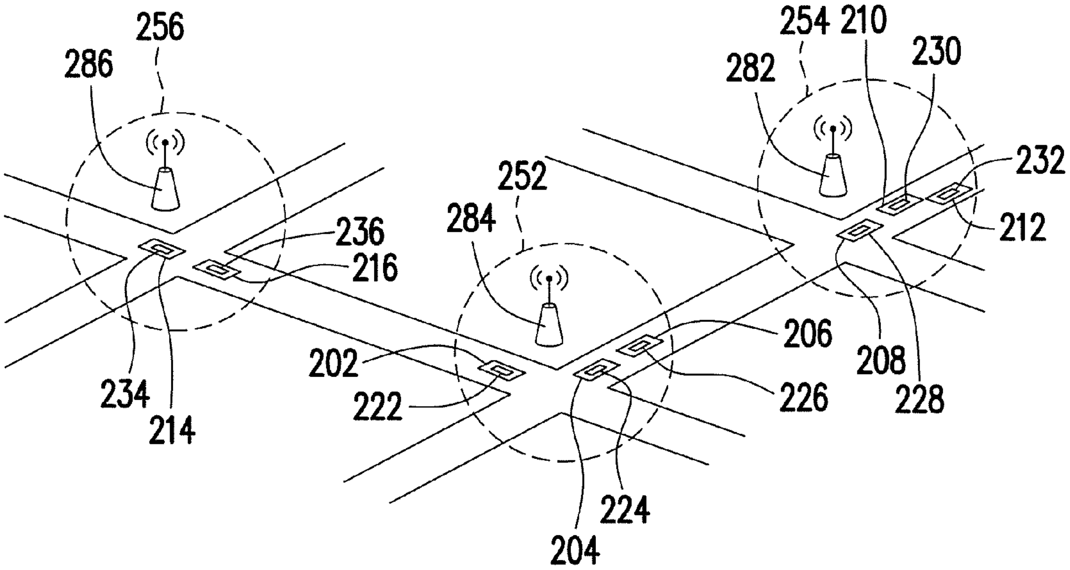
FIG. 2 is a diagram of a traveling fleet according to an exemplary embodiment of the present invention.

FIG. 2 is a diagram of a traveling fleet according to an exemplary embodiment of the present invention.

Referring to FIG. 2, the fleet includes vehicles 202, 204, 206, 208, 210, 212, 214, and 216. When the fleet is travelling, the vehicles 202, 204, 206, 208, 210, 212, 214, and 216 may be scattered into a plurality of sub-fleets 252, 254, and 256 by some special road conditions, wherein the sub-fleet 252 is composed of the vehicles 202, 204, and 206, the sub-fleet 254 is composed of the vehicles 208, 210, and 212, and the sub-fleet 256 is composed of the vehicles 214 and 216.

The vehicles 202, 204, 206, 208, 210, 212, 214, and 216 are respectively disposed with the in-vehicle communication devices 222, 224, 226, 228, 230, 232, 234, and 236. The in-vehicle communication devices 222, 224, 226, 228, 230, 232, 234, and 236 communicate with each other to transmit the current position coordinates and speeds of the vehicles 202, 204, 206, 208, 210, 212, 214, and 216. In particular, the in-vehicle communication devices 222, 224, 226, 228, 230, 232, 234, and 236 respectively provide suggested speeds to the vehicles 202, 204, 206, 208, 210, 212, 214, and 216 according to the current status of the fleet.

Figure 3:
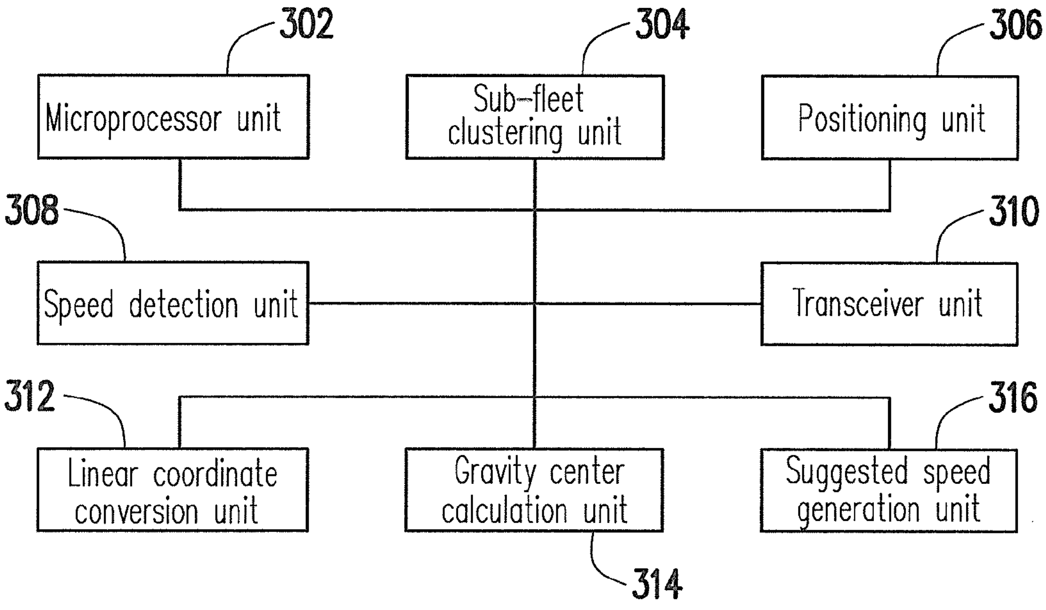
FIG. 3 illustrates in-vehicle communication devices according to an exemplary embodiment of the present invention.

FIG. 3 illustrates in-vehicle communication devices according to an exemplary embodiment of the present invention. The in-vehicle communication devices 222, 224, 226, 228, 230, 232, 234, and 236 all have the same structure and functions, and below, the in-vehicle communication device 222 configured in the vehicle 202 will be described as an example.

Referring to FIG. 3, the in-vehicle communication device 222 includes a microprocessor unit 302, a sub-fleet clustering unit 304, a positioning unit 306, a speed detection unit 308, a transceiver unit 310, a linear coordinate conversion unit 312, a, gravity center calculation unit 314, and a suggested speed generation unit 316.

The microprocessor unit 302 controls and coordinates the operations of the sub-fleet clustering unit 304, the positioning unit 306, the speed detection unit 308, the transceiver unit 310, the linear coordinate conversion unit 312, the gravity center calculation unit 314, and the suggested speed generation unit 316, wherein the sub-fleet clustering unit 304, the positioning unit 306, the speed detection unit 308, the transceiver unit 310, the linear coordinate conversion unit 312, the gravity center calculation unit 314, and the suggested speed generation unit 316 may also be built in the microprocessor unit 302.

The sub-fleet clustering unit 304 is coupled to the microprocessor unit 302, and the sub-fleet clustering unit 304 clusters the vehicle 202 into a specific sub-fleet and determines whether the vehicle 202 in the sub-fleet is a leader vehicle or a member vehicle. To be specific, the sub-fleet clustering unit 304 of the in-vehicle communication device 222 communicates and coordinates with the other in-vehicle communication devices within the communication range of the transceiver unit 310 under the control of the microprocessor unit 302 to determine which vehicles belong to the same sub-fleet and which vehicle is a leader vehicle. Herein the leader vehicle integrates the related information of the sub-fleet and communicates with the leader vehicles of other sub-fleets.

In the present exemplary embodiment, the sub-fleet clustering unit 304 communicates with other in-vehicle communication devices through a lowest-ID clustering algorithm, so as to determine which vehicles belong to the same sub-fleet and identify the leader vehicle of the sub-fleet.

Figure 4:
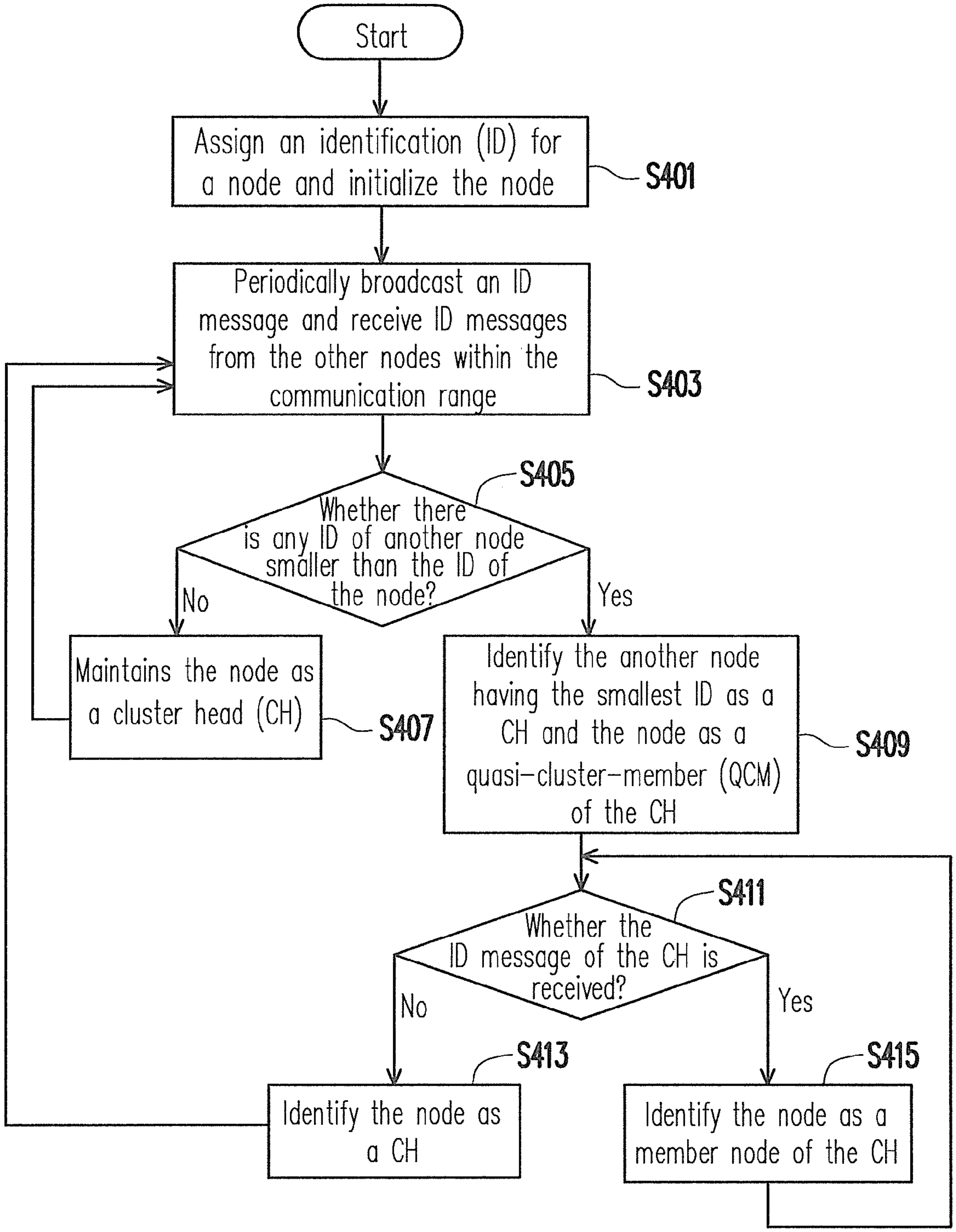
FIG. 4 is a flowchart of a lowest-ID clustering algorithm.
Figure 5:
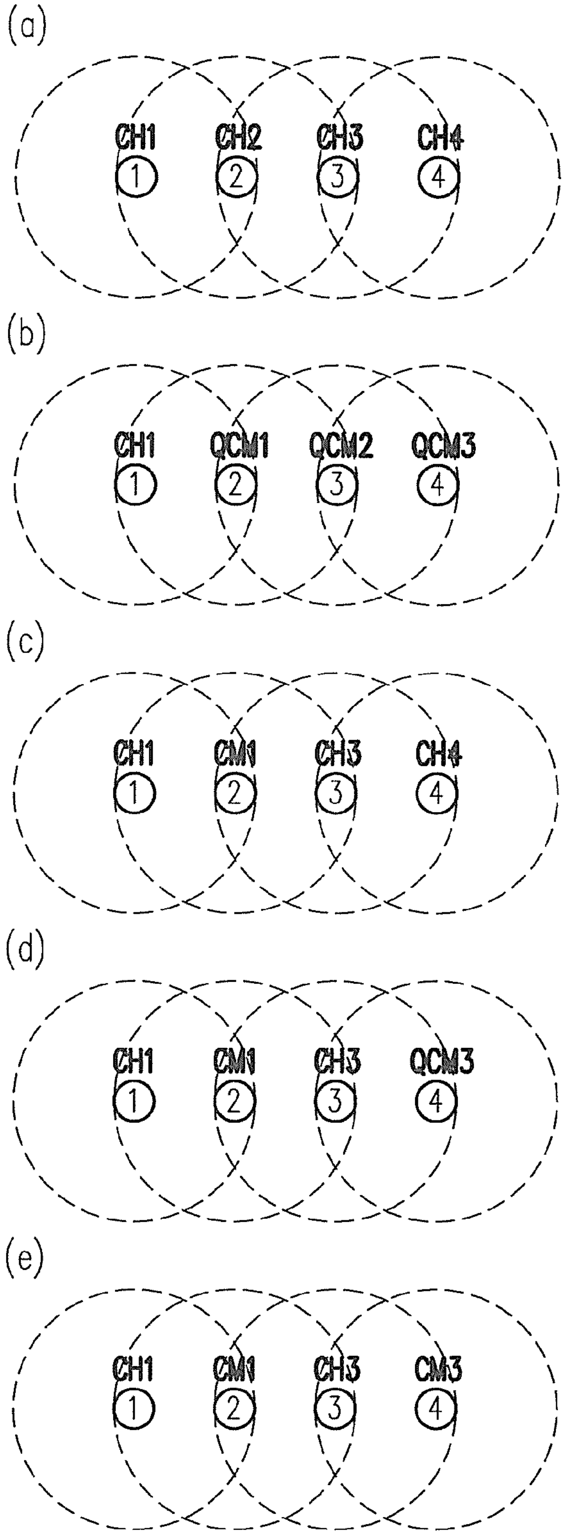
FIG. 5 is a diagram illustrating an execution example of a lowest-ID clustering algorithm.

FIG. 4 is a flowchart of a lowest-ID clustering algorithm, and FIG. 5 is a diagram illustrating an execution example of the lowest-ID clustering algorithm, wherein it is assumed that 4 nodes are to be clustered.

Referring to FIG. 4 and FIG. 5, in step S401, each node is assigned a unique identification (ID) and is initialized. For example, the 4 nodes are respectively a node 1, a node 2, a node 3, and a node 4, and the node 1, node 2, node 3, and node 4 identify themselves as cluster-heads (CHs), as shown in FIG. 5(*a*).

Next, in step S403, each node periodically broadcasts an ID message and receives ID messages from the other nodes within the communication range thereof.

In step S405, each node compares its own ID with the received IDs to determine whether there is any ID of another node smaller than its own ID. If the ID of the node is smaller than the IDs of the other nodes, in step S407, the node maintains itself as a CH (as the node 1 in FIG. 5(*b*)). If the ID of another node is smaller than the ID of the current node, in step S409, the node having the smallest ID is identified as a CH, and the current node is set as a quasi-cluster-member (QCM) of the CH (as the nodes 2, 3, and 4 in FIG. 5(*b*)).

After that, in step S411, each node determines whether the ID message of the CH is received. If the ID message of the CH is not received, in step S413, the node identifies itself as a CH (as the nodes 3 and 4 in FIG. 5(*c*)) and executes step S403 again to periodically broadcast its ID message, receive the ID messages of the other nodes within its communication range, and identify the node having the smallest ID (as the nodes 3 and 4 in FIG. 5(*d*)). If the ID message of the CH is received, in step S415, the node determines itself as a member node of the CH (as the node 2 in FIG. 5(*b*)) and then executes step S411 to constantly determine whether the ID message of the CH is received.

Referring to FIG. 5, in (a)~(c), the node 1 maintains itself as a CH, and the node 2 determines itself as a member node of the node 1. In (d)~(e), the node 3 determines itself as a CH and the node 4 determines itself as a member node of the node 3.

In the present exemplary embodiment, the sub-fleet clustering unit 304 determines which sub-fleet the vehicle 202 belongs to and whether the vehicle 202 is a leader vehicle or a member vehicle through the steps illustrated in FIG. 4. However, even though the leader vehicles are clustered and identified through the lowest-ID clustering algorithm in the present exemplary embodiment, the present invention is not limited thereto, and in another exemplary embodiment of the present invention, the leader vehicles may also be clustered and identified through a high connectivity clustering algorithm or other suitable clustering algorithms.

Referring to FIG. 3 again, the positioning unit 306 is coupled to the microprocessor unit 302, and the positioning unit 306 receives a plurality of position information from a positioning system (not shown) to determine the position coordinate of the vehicle 202. In the present exemplary embodiment, the positioning unit 306 is a satellite positioning system, and the positioning unit 306 receives the position information from a plurality of satellites to calculate the position coordinate of the vehicle 202. However, the present invention is not limited thereto, and in another exemplary embodiment of the present invention, the positioning unit 306 may also receive the position information through access points of a mobile communication system, such as an assisted global positioning system (A-GPS), to calculate the position coordinate of the vehicle 202.

The speed detection unit 308 is coupled to the microprocessor unit 302 for detecting the speed of the vehicle 202. In the present exemplary embodiment, the speed detection unit 308 is connected to an in-vehicle computer (not shown) disposed in the vehicle 202 to obtain the speed of the vehicle 202. However, the present invention is not limited thereto, and in another exemplary embodiment of the present invention, the speed detection unit 308 may also constantly calculate the speed of the vehicle 202 according to the position coordinate calculated by the positioning unit 306.

The transceiver unit 310 is coupled to the microprocessor unit 302 for receiving and transmitting signals. To be specific, the transceiver unit 310 receives messages (for example, speeds or position coordinates) from the in-vehicle communication devices (for example, an in-vehicle communication system 224 and an in-vehicle communication system 226) of other vehicles under the control of the microprocessor unit 302 and transmits messages to these in-vehicle communication devices of the other vehicles. In the present exemplary embodiment, the transceiver unit 310 is a communication device conforming to the IEEE 802.11p standard. Namely, the transceiver unit 310 allows the in-vehicle communication device 222 to form a vehicle ad-hoc network (VANET) with adjacent in-vehicle communication devices (for example, the in-vehicle communication device 224 and the in-vehicle communication device 226).

In addition, when the sub-fleet clustering unit 304 identifies the vehicle 202 as a leader vehicle, the transceiver unit 310 further communicates with the in-vehicle communication devices of other leader vehicles to transmit and receive messages. For example, in the present exemplary embodiment, the transceiver unit 310 communicates with roadside units (RSUs) and communicates with the in-vehicle communication devices of the other leader vehicles through the RSUs. As shown in FIG. 2, the transceiver unit 310 is connected to a RSU 284 and communicates with the leader vehicles (for example, the vehicles 208 and 214) of the sub-fleets 254 and 256 through the connection between the RSUs 284 and 282 and the connection between the RSUs 284 and 286 (for example, wired communication or wireless communication). In the present exemplary embodiment, the RSUs 282, 284, and 286 are also communication devices conforming to the IEEE 802.11p standard. However, the present invention is not limited thereto, and in another exemplary embodiment of the present invention, the RSUs may also be access points of a mobile communication network.

Figure 6:
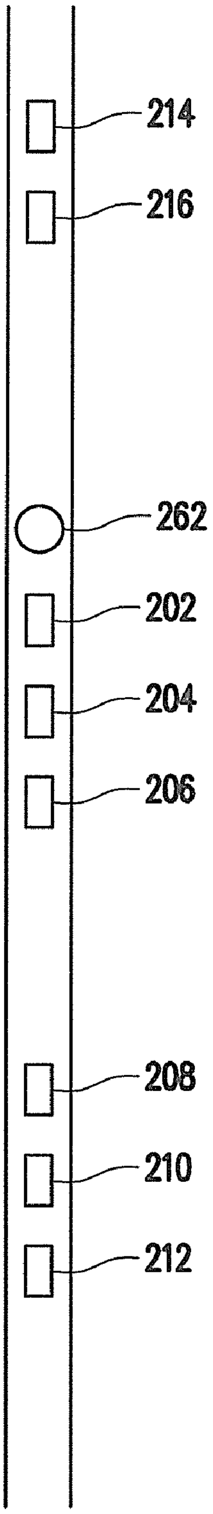
FIG. 6 is a diagram illustrating how to convert a position coordinate into a linear coordinate according to an exemplary embodiment of the present invention.

The linear coordinate conversion unit 312 is coupled to the microprocessor unit 302, and the linear coordinate conversion unit 312 converts the position coordinate of the vehicle 202 into a corresponding linear coordinate under the control of the microprocessor unit 302 and converts the position coordinates of the other vehicles into corresponding linear coordinates. To be specific, when the vehicle 202 is identified as a leader vehicle, the linear coordinate conversion unit 312 collects the position coordinates of the other vehicles in the sub-fleet corresponding to the vehicle 202. However, because a vehicle has to travel according to the actual roads, the distance between two vehicles has to be represented with a linear coordinate converted corresponding to the travelling path of the fleet (as shown in FIG. 6).

The gravity center calculation unit 314 is coupled to the microprocessor unit 302 and which calculates a sub-fleet gravity center of the sub-fleet 252 according to the corresponding linear coordinates calculated by the linear coordinate conversion unit 312. To be specific, when the vehicle 202 is identified as a leader vehicle, the gravity center calculation unit 314 calculates the sub-fleet gravity center of the sub-fleet corresponding to the vehicle 202 under the control of the microprocessor unit 302, wherein the sub-fleet gravity center is calculated according to following formula 0-1:

$$G_a(t) = \frac{\sum_{i \in a} P_i(t)}{n_a} \quad \text{(formula 0-1)}$$

In foregoing formula 0-1, $G_a(t)$ represents the sub-fleet gravity center of a sub-fleet a at time t, $P_i(t)$ is the linear coordinate of a vehicle i at time t, and $n_a$ is the number of vehicles in the sub-fleet.

Particularly, in foregoing example wherein the vehicle 202 is identified as a leader vehicle, the transceiver unit 310 communicates with the in-vehicle communication devices of other leader vehicles to transmit the fleet gravity center of the sub-fleet 252 to the in-vehicle communication devices (for example an in-vehicle communication device 234) of the other leader vehicles (for example, a vehicle 214) and receive the sub-fleet gravity centers of other sub-fleets from the in-vehicle communication devices of the other leader vehicles. Besides, after receiving the sub-fleet gravity centers of the other sub-fleets, the gravity center calculation unit 314 calculates a fleet gravity center 262 of the entire fleet according to the sub-fleet gravity center of the current sub-fleet and the received sub-fleet gravity centers of the other sub-fleets under the control of the microprocessor unit 302 (as shown in FIG. 6), wherein the fleet gravity center is calculated according to following formula 0-2:

$$Gg(t) = \frac{\sum_{i \in SG} Gi(t) * n_i}{N} \quad \text{(formula 0-2)}$$

or $$Gg(t) = \frac{\sum_{i \in SG} Gi(t)}{M}$$

In foregoing formula 0-2, $G_g(t)$ represents the fleet gravity center of a fleet at time t, $G_i(t)$ is the sub-fleet gravity center of a sub-fleet i at time t, SG is the collection of sub-fleets in the fleet, $n_i$ is the number of vehicles in the sub-fleet i, N is the number of vehicles in the entire fleet, and M is the number of the sub-fleets.

The suggested speed generation unit 316 is coupled to the microprocessor unit 302 for generating a suggested speed for the vehicle 202.

In the present exemplary embodiment, when the sub-fleet clustering unit 304 identifies the vehicle 202 as a leader vehicle, the suggested speed generation unit 316 receives the speed of the vehicle 202 from the speed detection unit 308, and the suggested speed generation unit 316 calculates an average relative speed according to the speeds of the other vehicles (i.e., the vehicles 204 and 206) in the sub-fleet 252 received by the transceiver unit 310. For example, the suggested speed generation unit 316 first calculates a difference between the speed of the vehicle 202 and the speed of the vehicle 204 and a difference between the speed of the vehicle 202 and the speed of the vehicle 206, and then calculates an average value of the two differences to obtain the average relative speed of the vehicle 202. In addition, the suggested speed generation unit 316 calculates a distance between the vehicle 202 and the fleet gravity center 262 calculated by the gravity center calculation unit 314 as a gravity center distance. Finally, the suggested speed generation unit 316 calculates the suggested speed of the vehicle 202 according to the speed, the gravity center distance, and the average relative speed of the vehicle 202.

To be specific, in the present exemplary embodiment, the suggested speed generation unit 316 calculates a gravity center region reference distance and a linear region reference distance according to a communication distance of the transceiver unit 310 with the fleet gravity center as a center. For example, in the present exemplary embodiment, the gravity center region reference distance is the communication distance starting from the fleet gravity center, and the linear region reference distance is a predetermined multiple of the communication distance starting from the fleet gravity center, wherein the predetermined multiple is determined by a user, and the predetermined multiple is greater that 1. In the present exemplary embodiment, the predetermined multiple is set to 5. After that, the suggested speed generation unit 316 determines the suggested speed of the vehicle 202 according to whether the gravity center distance of the vehicle 202 exceeds the gravity center region reference distance and the linear region reference distance. It should be noted herein that in the present exemplary embodiment, the gravity center region reference distance and the linear region reference distance are used for distinguishing three regions so as to distinguish the current position of the vehicle 202 and execute different speed adjustment calculations. However, the present invention is not limited thereto, and in another exemplary embodiment of the present invention, the current position of the vehicle may also be distinguished with two or more regions.

In the present exemplary embodiment, when the gravity center distance between the vehicle 202 and the fleet gravity center 262 does not exceed the gravity center region reference distance, the suggested speed generation unit 316 serves the average speed of all the vehicles 202, 204, 206, 208, 210, 212, 214, and 216 in the fleet as the suggested speed of the vehicle 202.

In the present exemplary embodiment, when the gravity center distance between the vehicle 202 and the fleet gravity center 262 exceeds the gravity center region reference distance but does not exceed the linear region reference distance, the suggested speed generation unit 316 calculates the suggested speed of the vehicle 202 through following formula 1:

$$V(t+1)=V(t)+\alpha^*(D_{i,g}/(D_{LR}+D_{GR}))^*A+(1-\alpha)^* V_{i,Neighbors}(t) \quad \text{(formula 1)}$$

In foregoing formula 1, V(t+1) is the suggested speed of the vehicle 202, V(t) is the speed of the vehicle 202, α falls within 0%~100%, $D_{i,g}$ is the gravity center distance of the vehicle 202, $D_{LR}$ is the linear region reference distance, $D_{GR}$ is the gravity center region reference distance, A is a maximum acceleration, and $V_{i,Neighbors}(t)$ is the average of velocity difference between Vehicle 202 and neighbors of Vehicle 202.

In the present exemplary embodiment, A is determined by the user, wherein if A has a greater value, the speed of the vehicle 202 is then adjusted in a greater range, and if A has a smaller value, the speed of the vehicle 202 is then adjusted in a smaller range. Besides, α is also determined by the user, wherein if α has a smaller value, the speed of the vehicle 202 tends more to being adjusted by referring to the speeds of adjusted vehicles, and if α has a greater value, the speed of the vehicle 202 tends more to being adjusted by not referring to the speeds of the adjacent vehicles. In the present exemplary embodiment, A is set to 3 $m^2$/second, and a is set to 60%.

In the present exemplary embodiment, when the gravity center distance between the vehicle 202 and the fleet gravity center 262 exceeds the linear region reference distance, the suggested speed generation unit 316 calculates the suggested speed of the vehicle 202 according to following formula 2:

$$V(t+1)=V(t)\pm A \quad \text{(formula 2)}$$

In foregoing formula 2, when the position of the vehicle 202 is ahead of the fleet gravity center, the suggested speed generation unit 316 uses (V(t)−A) as the suggested speed, and when the position of the vehicle 202 is behind the fleet gravity center, the suggested speed generation unit 316 uses (V(t)+A) as the suggested speed.

Additionally, in the present exemplary embodiment, when the sub-fleet clustering unit 304 identifies the vehicle 202 as a member vehicle, the suggested speed generation unit 316 receives the speed of the vehicle 202 from the speed detection unit 308, and the suggested speed generation unit 316 calculates the average relative speed according to the speeds of the other vehicles (i.e., the vehicles 204 and 206) in the sub-fleet 252 received by the transceiver unit 310. Finally, the suggested speed generation unit 316 calculates the suggested speed of the vehicle 202 according to the speed of the vehicle 202 and the average relative speed (as following formula 3):

$$V(t+1)=V(t)+\beta^{*}V_{i,Neighbors}(t)+(1-\beta)^{*}V_{i,Leader}(t) \quad \text{(formula 3)}$$

In foregoing formula 3, the $V_{i,Leader}(t)$ is the relative speed with its pseudo-leader (i.e. leader vehicle). Each member vehicle decides its own speed based on both its relative speed with its leader vehicle and its relative speed with other neighbors, where the relative importance of these two factors is adjusted by a value β (set to 50%). Both the relative speed should not be greater than a maximum acceleration. Namely, when the relative speed is greater than the maximum acceleration, the maximum acceleration is adopted for replacing the calculated relative speed.

In an exemplary embodiment of the present invention, the in-vehicle communication device 222 further includes a suggested speed reminding unit (not shown) for displaying the suggested speed generated by the suggested speed generation unit 316 to the driver of the vehicle 202. Herein, the suggested speed reminding unit may be a display screen or an audio player.

As described above, in the present exemplary embodiment, when the vehicle 202 is identified as a leader vehicle, the in-vehicle communication device 222 collects the information of other vehicles in the sub-fleet and communicates with other sub-fleets to determine a suggested speed of the vehicle 202. Contrarily, when the vehicle 202 is identified as a member vehicle, the in-vehicle communication device 222 of the vehicle 202 provides related information to the leader vehicle within the communication range of the vehicle 202 and adjusts the speed according to the speeds of the leader vehicle and the speeds of other member vehicles in the sub-fleet.

Figure 7:
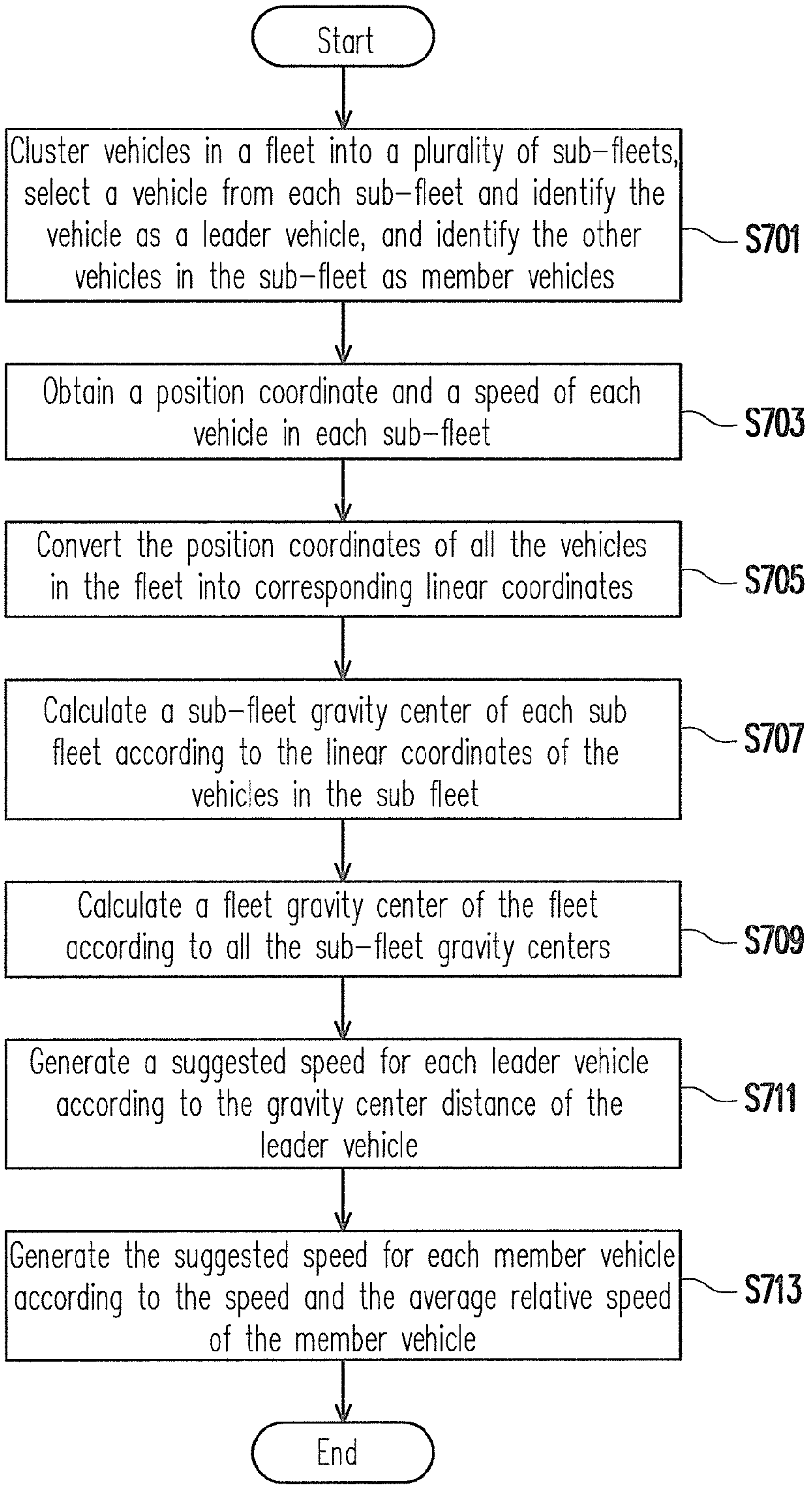
FIG. 7 is a flowchart of a fleet maintenance method according to an exemplary embodiment of the present invention.

FIG. 7 is a flowchart of a fleet maintenance method according to an exemplary embodiment of the present invention.

Referring to FIG. 7, in step S701, vehicles in a fleet are clustered into a plurality of sub-fleets, wherein a vehicle is selected from each sub-fleet and identified as a leader vehicle, and the other vehicles in the sub-fleet are identified as member vehicles. The method for clustering the vehicles and identifying the leader vehicle has been described in detail above with reference to FIG. 4 and FIG. 5 therefore will not be described herein. In addition, because each sub-fleet has the same operations, vehicles in the sub-fleet 252 will be taken as example to explain the operations of the sub-fleets.

In step S703, a position coordinate and a speed of each vehicle in each sub-fleet are obtained.

For example, as shown in FIG. 2, in the example that the leader vehicles of the sub-fleets 252, 254, and 256 are respectively vehicles 202, 208, and 214 (i.e., the other vehicles 204, 206, 210, 212, and 216 are member vehicles), the in-vehicle communication device 222 of the vehicle 202 in the sub-fleet 252 obtains the position coordinate and the speed of the vehicle 204 from the in-vehicle communication device 224 of the vehicle 204 and obtains the position coordinate and the speed of the vehicle 206 from the in-vehicle communication device 226 of the vehicle 206. Besides, the in-vehicle communication device 224 of the vehicle 204 also obtains the speed of the vehicle 202 from the in-vehicle communication device 222 of the vehicle 202 and the speed of the vehicle 206 from the in-vehicle communication device 226 of the vehicle 206. In addition, the in-vehicle communication device 226 of the vehicle 206 also obtains the speed of the vehicle 202 from the in-vehicle communication device 222 of the vehicle 202 and the speed of the vehicle 204 from the in-vehicle communication device 224 of the vehicle 204.

Next, in step S705, the position coordinates of all the vehicles in the fleet are converted into corresponding linear coordinates. After that, in step S707, a sub-fleet gravity center of each sub-fleet is calculated according to the linear coordinates of the vehicles in the sub-fleet, and in step S709, a fleet gravity center of the fleet is calculated according to all the sub-fleet gravity centers.

Figure 8:
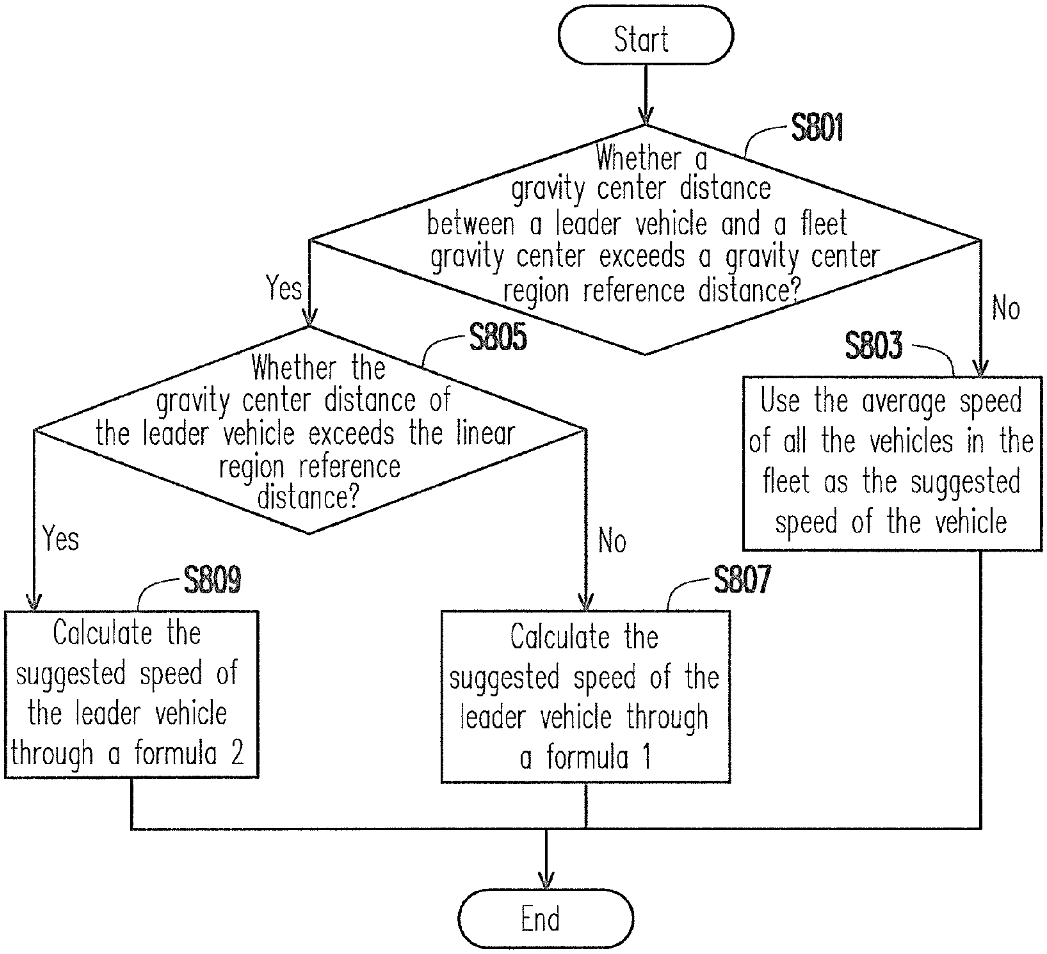
FIG. 8 is a detailed flowchart illustrating how a suggested speed of a leader vehicle is generated according to an exemplary embodiment of the present invention.

Thereafter, in step S711, a suggested speed of each leader vehicle is generated according to the gravity center distance of the leader vehicle. FIG. 8 is a detailed flowchart illustrating how a suggested speed of a leader vehicle is generated according to an exemplary embodiment of the present invention.

Referring to FIG. 8, in step S801, whether a gravity center distance between the leader vehicle 202 and the fleet gravity center 262 exceeds a gravity center region reference distance is determined, wherein the method for calculating the gravity center region reference distance has been described above therefore will not be described herein. If the gravity center distance of the leader vehicle 202 does not exceed the gravity center region reference distance, in step S803, the average speed of all the vehicles in the fleet is sued as the suggested speed of the vehicle 202. To be specific, in step S703, the in-vehicle communication device 222 of the leader vehicle 202 obtains the speed of each vehicle in the sub-fleet 252, and the in-vehicle communication device 222 of the leader vehicle 202 shares the information with the in-vehicle communication device 228 of the leader vehicle 208 and the in-vehicle communication device 234 of the leader vehicle 214 through RSUs 282, 284, and 286 and obtains the speeds of the vehicles in the sub-fleets 254 and 256 from the in-vehicle communication device 228 of the leader vehicle 208 and the in-vehicle communication device 234 of the leader vehicle 214.

If the gravity center distance of the leader vehicle 202 exceeds the gravity center region reference distance, in step S805, whether the gravity center distance of the leader vehicle 202 exceeds the linear region reference distance is determined, wherein the method for calculating the linear region reference distance has been described above therefore will not be described herein. If the gravity center distance of the leader vehicle 202 does not exceed the linear region reference distance, in step S807, the suggested speed of the leader vehicle 202 is calculated through foregoing formula 1. If the gravity center distance of the leader vehicle 202 exceeds the linear region reference distance, in step S809, the suggested speed of the leader vehicle 202 is calculated through foregoing formula 2.

As described above, the suggested speed of each leader vehicle is calculated according to the speed, the gravity center distance, and the average relative speed of the leader vehicle, wherein the average relative speed of the leader vehicle is calculated according to the speed of the leader vehicle and the speeds of other vehicles in the sub-fleet corresponding to the leader vehicle.

Referring to FIG. 7 again, finally, in step S713, the suggested speed of each member vehicle is generated according to the speed and the average relative speed of the member vehicle (as foregoing formula 3).

Figure 9:
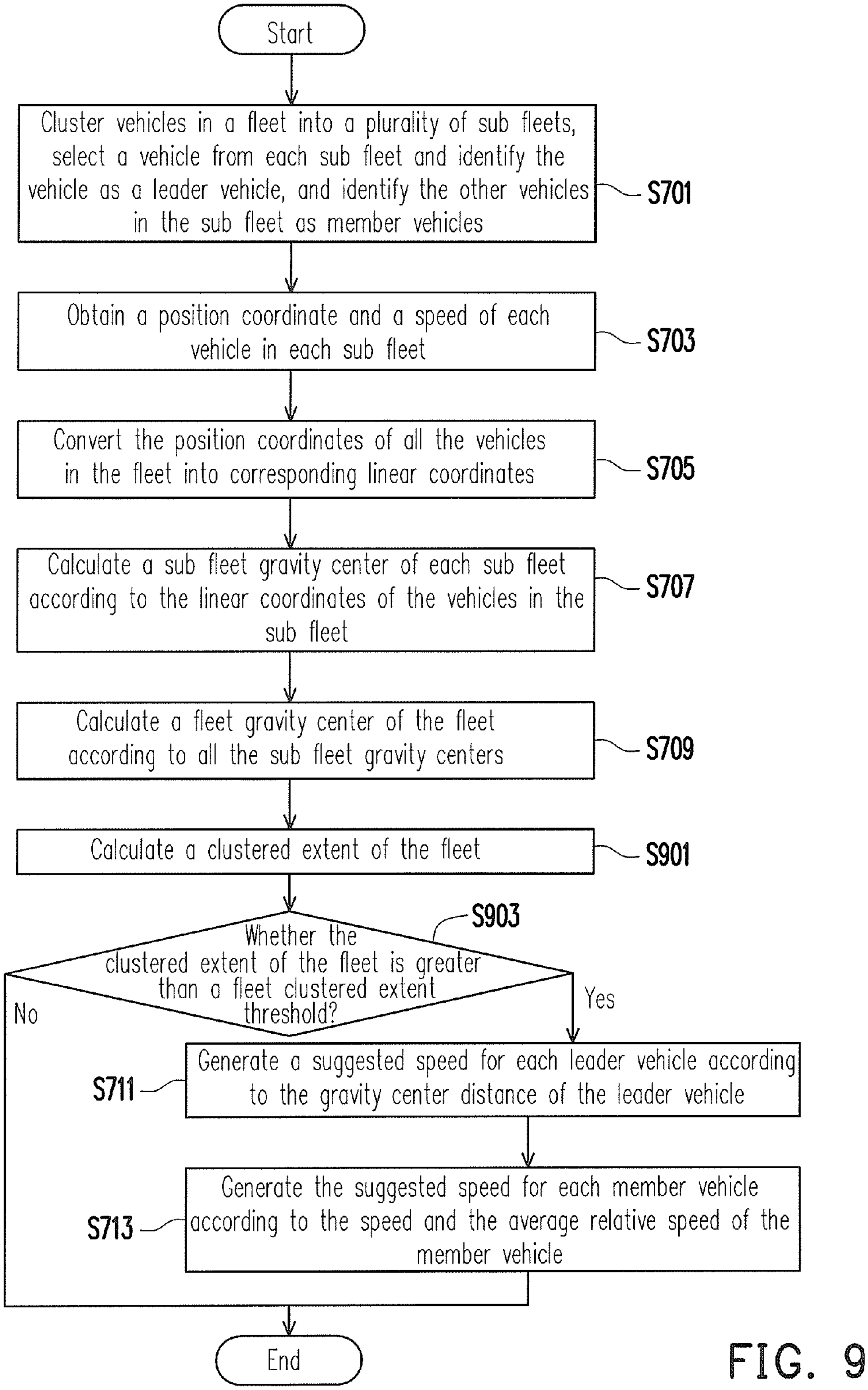
FIG. 9 is a flowchart of a fleet maintenance method according to another exemplary embodiment of the present invention.

It should be mentioned that in another exemplary embodiment of the present invention, whether steps S711 and S713 are executed may be further determined according to clustered extent of the fleet. FIG. 9 is a flowchart of a fleet maintenance method according to another exemplary embodiment of the present invention.

Referring to FIG. 9, the clustered extent of the fleet is further calculated before step S711 (step S901), wherein the clustered extent of the fleet is calculated through following formula 4:

$$G_{diff} = \frac{\sum_{j \in SG} \|G_j(t) - G_g(t)\| * n_j}{N} \quad \text{(formula 4)}$$

or $$G_{diff} = \frac{\sum_{j \in SG} \|G_j(t) - G_g(t)\|}{M}$$

In foregoing formula 4, $G_{diff}$ represents the clustered extent of the fleet, $G_g(t)$ represents the fleet gravity center of the fleet at time t, $G_j(t)$ represents the sub-fleet gravity center of a sub-fleet j at time t, SG is the collection of sub-fleets in the fleet, $n_j$ is the number of vehicles in the sub-fleet j, N is the number of vehicles in the entire fleet, and M is the number of sub-fleets in the fleet.

After that, in step S903, whether the clustered extent of the fleet is greater than a fleet clustered extent threshold is determined. In the present exemplary embodiment, the fleet clustered extent threshold is a non-negative value determined by a user, wherein the lower value the fleet clustered extent threshold has, the more frequently the suggested speed is generated; otherwise, the higher value the fleet clustered extent threshold has, the less frequently the suggested speed is generated. In the present exemplary embodiment, the fleet clustered extent threshold is set to 1000.

If the fleet clustered extent is greater than the fleet clustered extent threshold, step S711 is executed. The other steps in FIG. 9 besides the steps S901 and S903 are the same as the steps illustrated in FIG. 7 therefore will not be described herein.

As described above, in the fleet maintenance method provided by exemplary embodiments of the present invention, the suggested speed of a leader vehicle in a sub-fleet is generated according to a fleet gravity center, and the suggested speed of a member vehicle is generated according to the speeds of the other vehicles in the sub-fleet, so that the vehicles in a fleet can be maintained within a clustered extent. Moreover, through the in-vehicle communication device provided by exemplary embodiments of the present invention, a vehicle can transmit information to other vehicles within the communication range of the vehicle, so that the vehicle can be maintained in a sub-fleet, and meanwhile, leader vehicles can transmit related information through RSUs, so that the sub-fleets can be maintained within the fleet. Thereby, vehicles can be maintained in the fleet.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fleet maintenance method, for maintaining a fleet, wherein the fleet comprises a plurality of vehicles, the fleet maintenance method comprising:
- clustering the vehicles into a plurality of sub-fleets, and selecting one of the vehicles in each of the sub-fleets as a leader vehicle and the other vehicles as member vehicles;
- obtaining a position coordinate and a speed of each the vehicle in each of the sub-fleets;
- converting the position coordinates of the vehicles into a plurality of corresponding linear coordinates;
- calculating a sub-fleet gravity center of each the sub-fleet, wherein the sub-fleet gravity center of the sub-fleet is calculated according to the corresponding linear coordinates of the vehicles in the sub-fleet;
- calculating a fleet gravity center of the fleet according to the sub-fleet gravity centers of the sub-fleets; and
- generating a suggested speed of each the leader vehicle according to a gravity center distance of the leader vehicle, wherein the gravity center distance of the leader vehicle is calculated according to a distance between the leader vehicle and the fleet gravity center.

2. The fleet maintenance method according to claim 1, wherein the step of generating the suggested speed of each the leader vehicle according to the gravity center distance of the leader vehicle comprises:
- calculating the suggested speed of each the leader vehicle according to the speed, the gravity center distance, and a average relative speed of the leader vehicle, wherein the average relative speed of the leader vehicle is calculated according to the speed of the leader vehicle and the speeds of the other vehicles in the sub-fleet corresponding to the leader vehicle.

3. The fleet maintenance method according to claim 1 further comprising generating the suggested speed of each the member vehicle according to the speed and a average relative speed of the member vehicle, wherein the average relative speed of the member vehicle is calculated according to the speed of the member vehicle and the speeds of the other vehicles in the sub-fleet corresponding to the member vehicle.

4. The fleet maintenance method according to claim 1 further comprising calculating a fleet clustered extent according to the sub-fleet gravity centers and the fleet gravity center and generating the suggested speed of each the leader vehicle according to the gravity center distance of the leader vehicle only when the fleet clustered extent is greater than a fleet clustered extent threshold.

5. The fleet maintenance method according to claim 1 further comprising configuring an in-vehicle communication device in each of the vehicles for forming a vehicle ad-hoc network (VANET) in each of the sub-fleets.

6. The fleet maintenance method according to claim 5, wherein the step of obtaining the position coordinate and the speed of each the vehicle in each of the sub-fleets comprises:
- receiving the position coordinates and the speeds of the member vehicles in the corresponding sub-fleet from the in-vehicle communication devices of the member vehicles by using the in-vehicle communication device of each the leader vehicle.

7. The fleet maintenance method according to claim 5 further comprising configuring a communication system for connecting the in-vehicle communication devices of the leader vehicles, wherein the communication system is a mobile communication network or a plurality of roadside units (RSUs) connected with each other through a wireless network or a wired network.

8. The fleet maintenance method according to claim 5, wherein the RSUs and the in-vehicle communication devices conform to an IEEE 802.11p standard.

9. The fleet maintenance method according to claim 1, wherein the step of clustering the vehicles into the sub-fleets comprises clustering the vehicles into the sub-fleets through a lowest-ID clustering algorithm.

10. The fleet maintenance method according to claim 2, wherein the step of calculating the suggested speed of each of the leader vehicles according to the speed, the gravity center distance, and the average relative speed of the leader vehicle comprises:

calculating a gravity center region reference distance and a linear region reference distance according to a communication distance of the in-vehicle communication device, wherein the gravity center region reference distance is the communication distance, and the linear region reference distance is obtained by multiplying the communication distance by a predetermined multiple;

determining whether a distance between the leader vehicle and the fleet gravity center is greater than the gravity center region reference distance;

setting the suggested speed of the leader vehicle as an average speed of the vehicles when the distance between the leader vehicle and the fleet gravity center is not greater than the gravity center region reference distance; and determining whether the distance between the leader vehicle and the fleet gravity center is greater than the linear region reference distance when the distance between the leader vehicle and the fleet gravity center is greater than the gravity center region reference distance, wherein when the distance between the leader vehicle and the fleet gravity center is not greater than the linear region reference distance, the suggested speed of the leader vehicle is calculated according to a formula 1:

$$V(t+1)=V(t)+\alpha*(D_{i,g}/(D_{LR}+D_{GR}))*A+(1-\alpha)*V_{i,Neighbors}(t) \quad \text{(formula 1)},$$

wherein V(t+1) is the suggested speed of the leader vehicle, V(t) is the speed of the leader vehicle, a falls within 0%~100%, $D_{i,g}$ is the gravity center distance of the leader vehicle, $D_{LR}$ is the linear region reference distance, $D_{GR}$ is the gravity center region reference distance, A is a maximum acceleration, and $V_{i,Neighbors}(t)$ is the average relative speed between itself and its neighbors, wherein when the distance between the leader vehicle and the fleet gravity center is greater than the linear region reference distance, the suggested speed of the leader vehicle is calculated according to a formula 2:

$$V(t+1)=V(t)\pm A \quad \text{(formula 2)}.$$

11. An in-vehicle communication system, suitable for being configured in a vehicle and maintaining the vehicle in a fleet, the in-vehicle communication system comprising:

a microprocessor unit;

a sub-fleet clustering unit, coupled to the microprocessor unit, for clustering the vehicle into a sub-fleet and determining the vehicle as a leader vehicle or a member vehicle;

a positioning unit, coupled to the microprocessor unit, for receiving a plurality of position information from a positioning system to determine a position coordinate of the vehicle;

a speed detection unit, coupled to the microprocessor unit, for detecting a speed of the vehicle;

a transceiver unit, coupled to the microprocessor unit, for receiving position coordinates and speeds of a plurality of other vehicles in the sub-fleet from the other vehicles;

a linear coordinate conversion unit, coupled to the microprocessor unit, for converting the position coordinate of the vehicle and the position coordinates of the other vehicles into a plurality of corresponding linear coordinates;

a gravity center calculation unit, coupled to the microprocessor unit, for calculating a sub-fleet gravity center of the sub-fleet according to the corresponding linear coordinates, wherein the gravity center calculation unit further calculates a fleet gravity center of the fleet according to sub-fleet gravity centers received by the transceiver unit from a plurality of other leader vehicles and the sub-fleet gravity center; and a suggested speed generation unit, coupled to the microprocessor unit, wherein when the sub-fleet clustering unit determines the vehicle as the leader vehicle, the suggested speed generation unit generates a suggested speed of the vehicle according to a gravity center distance between the fleet gravity center and the vehicle.

12. The in-vehicle communication system according to claim 11, wherein when the sub-fleet clustering unit determines the vehicle as the leader vehicle, the suggested speed generation unit further calculates the suggested speed of the vehicle according to the speed, the gravity center distance, and an average relative speed of the vehicle, wherein the average relative speed of the vehicle is calculated according to the speed of the vehicle and the speeds of the other vehicles.

13. The in-vehicle communication system according to claim 11, wherein when the sub-fleet clustering unit determines the vehicle as the member vehicle, the suggested speed generation unit generates the suggested speed of the vehicle according to the speed and an average relative speed of the vehicle, wherein the average relative speed of the vehicle is calculated according to the speed of the vehicle and the speeds of the other vehicles.

14. The in-vehicle communication system according to claim 11, wherein when the sub-fleet clustering unit determines the vehicle as the leader vehicle, the suggested speed generation unit calculates a fleet clustered extent according to the sub-fleet gravity center, the other fleet gravity center, and the fleet gravity center, and the suggested speed generation unit generates the suggested speed of the vehicle according to the gravity center distance only when the fleet clustered extent is greater than a fleet clustered extent threshold.

15. The in-vehicle communication system according to claim 11, wherein the transceiver unit conforms to an IEEE 802.11p standard.

16. The in-vehicle communication system according to claim 11, wherein the sub-fleet clustering unit clusters the vehicle into the sub-fleet and determines the vehicle as the leader vehicle or the member vehicle through a lowest-ID clustering algorithm.

17. The in-vehicle communication system according to claim 12, wherein when the sub-fleet clustering unit determines the vehicle as the leader vehicle, the suggested speed generation unit further:

calculates a gravity center region reference distance and a linear region reference distance according to a communication distance of the transceiver unit, wherein the gravity center region reference distance is the communication distance, and the linear region reference distance is obtained by multiplying the communication distance by a predetermined multiple;

determines whether a distance between the vehicle and the fleet gravity center is greater than the gravity center region reference distance;

sets the suggested speed of the vehicle as an average speed of the fleet when the distance between the vehicle and the fleet gravity center is not greater than the gravity center region reference distance; and determines whether the distance between the vehicle and the fleet gravity center is greater than the linear region reference distance when the distance between the vehicle and the fleet gravity center is greater than the gravity center region reference distance, wherein when the distance between the vehicle and the fleet gravity center is not greater than the linear region reference distance, the suggested speed generation unit calculates the suggested speed of the vehicle according to a formula:

$$V(t+1)=V(t)+\alpha*(D_{i,g}/(D_{LR}+D_{GR}))*A+(1-\alpha)*V_{i,Neighbors}(t) \quad \text{(formula 1)},$$

wherein V(t+1) is the suggested speed of the vehicle, V(t) is the speed of the vehicle, a falls within 0%~100%, $D_{i,g}$ is the gravity center distance of the vehicle, $D_{LR}$ is the linear region reference distance, $D_{GR}$ is the gravity center region reference distance, A is a maximum acceleration, and $V_{i,Neighbors}(t)$ is the average of velocity difference between itself and its neighbors, wherein when the distance between the vehicle and the fleet gravity center is greater than the linear region reference distance, the suggested speed generation unit calculates the suggested speed of the vehicle according to formula 2:

$$V(t+1)=V(t)\pm A \quad \text{(formula 2)}.$$

* * * * *